(12) United States Patent
Ikemoto

(10) Patent No.: US 7,493,633 B2
(45) Date of Patent: Feb. 17, 2009

(54) DRIVE MOTOR FOR RECORDING DISK AND RECORDING DISK DRIVE USING THE DRIVE MOTOR FOR RECORDING DISK

(75) Inventor: Hideya Ikemoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 363 days.

(21) Appl. No.: 11/161,252

(22) Filed: Jul. 28, 2005

(65) Prior Publication Data
US 2006/0031867 A1    Feb. 9, 2006

(30) Foreign Application Priority Data
Aug. 4, 2004    (JP) .............................. 2004-227831

(51) Int. Cl.
*G11B 17/03*    (2006.01)
(52) U.S. Cl. ..................................... 720/707
(58) Field of Classification Search .................. 720/707
See application file for complete search history.

(56) References Cited

U.S. PATENT DOCUMENTS 6,041,033 A * 3/2000 Otsubo et al. ............... 720/707
6,826,771 B1 * 11/2004 Wada ........................ 720/707
6,868,549 B2 * 3/2005 Watanabe et al. ............ 720/715
6,871,352 B2 * 3/2005 Kurosaka et al. ............ 720/707
6,957,443 B2 * 10/2005 Horng et al. ................ 720/707

FOREIGN PATENT DOCUMENTS

| JP | 11-120652 A | 4/1999 |
| JP | 2000-268461 A | 9/2000 |
| JP | 2001-076418 A | 3/2001 |
| JP | 2001-101738 | 4/2001 |
| JP | 2004-213812 A | 7/2004 |

OTHER PUBLICATIONS

Chinese Office Action dated Jun. 6, 2008 of CN 2005100899244.

* cited by examiner

*Primary Examiner*—Angel A. Castro
(74) *Attorney, Agent, or Firm*—Westerman, Hattori, Daniels & Adrian, LLP.

(57) ABSTRACT

A drive motor for a recording disk of one example of the present invention includes a rotor holder (12) fixed to a shaft (8) which is a rotational member and a centering portion (20). A spacer (38) is provided between a base portion of a chuck (26), at least one portion thereof is accommodated in the centering portion (20), and a rotor holder (12).

20 Claims, 11 Drawing Sheets

DRIVE MOTOR FOR RECORDING DISK AND RECORDING DISK DRIVE USING THE DRIVE MOTOR FOR RECORDING DISK

BACKGROUND OF THE INVENTION

1. Field of the Invention

The present invention relates to a drive motor for a recording disk for driving various kinds of recording disks such as CD, DVD, PD, or the like and a recording disk drive using the drive motor for a recording disk.

2. Background Art

For example, as a drive motor for a recording disk, a structure shown in FIG. 11 has been known. A rotor 100 of the motor includes a shaft 104 rotatably supported to a sleeve 102 which is a static member, a rotor holder 106 supported at an axially upper portion of the shaft 104, and a disk holder 108 supported above the rotor holder 106 at the axially upper side of the shaft 104. The disk holder 108 includes a turn table 115 on which a recording disk 114 is mounted, a centering portion portion 116 provided in the central portion of the turn table 115, and a plurality of chucks 112 radially outwardly biased by respective coil springs 110 circumferentially evenly disposed in the centering portion portion 116.

When such a motor is used, a central hole of the recording disk 114 is attached to the centering portion portion 116. When the centering portion portion 116 begins fitting into the central hole of the recording disk 114, each of the chucks 112 is pushed by an inner circumferential surface of the central hole of the recording disk 114 to move radially inwardly. Then, when the recording disk 114 is completely attached and is mounted on a disk mount surface 115a of the turn table 115, a tip portion 112b of the chuck 112 is pushed by a restoring force of the coil springs 110 to press an upper edge portion of the inner circumferential surface of the recording disk 114, thereby permitting the recording disk 114 to be held on the rotor 100. Consequently, during rotation of the rotor 100, the recording disk 114 neither comes away nor inclines due to a centrifugal force or its own weight.

In the aforementioned structure, since an axial thickness of the recording disk 114 is specified in the standards, a certain axial distance needs to be maintained between the disk mount surface 115a and the tip portion 112b of the chuck 112 in order to hold the recording disk 114.

Therefore, in a state that the tip portion 112b of the chuck 112 is engaged with an upper edge portion of the inner circumferential surface of the recording disk 114 (a state of holding the recording disk), a comparatively large interspace 120 intervenes between a base portion 112a of the chuck 112 and an upper surface of the rotor holder 106.

If the interspace 120 intervenes, when the recording disk 114 is removed from the state that the recording disk 114 is held by the rotor 100, a force (hereinafter, such a force is referred to as a recording disk draw force) required to remove the recording disk 114 from the rotor 100 may be lowered. That is, when the recording disk 114 is removed from the rotor 100, the chuck 112 is pushed by the inner circumferential surface of the recording disk 114 to receive an axially upward force; but, since the interspace 120 intervenes, the chuck 112 easily rotates in the state being biased by the coil springs 110 instead of moving the base portion 112a radially inwardly against the bias of the coil spring 110. Therefore, an axially upward movement amount of the tip portion 112b of the chuck 112 increases, so that the recording disk draw force is remarkably reduced. When the recording disk draw force is reduced, the recording disk 114 may easily come off from the rotor 100 during rotation of the motor due to centrifugal forces, outside shocks, or the like.

Here, an axial size of the interspace 120 can be decreased by reducing the axial thickness of the turn table 115 to move the disk mount surface 115a axially downwardly. However, such a configuration causes rigidity of the turn table 115 to be lowered.

On the other hand, when the spring force of the coil spring 110 is strengthened, that is, when the spring constant is increased, a lowering of the recording disk draw force can be prevented. However, radially inward movement of the chuck 112 becomes difficult, and a force required to mount the recording disk 114 on the rotor 100 (hereinafter, such a force is referred to as a recording disk attachment force) increases. Consequently, attachment of the recording disk 114 to the rotor 100 becomes difficult, resulting in degradation of operability.

BRIEF SUMMARY OF THE INVENTION

According to the present invention, it is possible to provide a drive motor for a recording disk and a recording disk drive using the drive motor for a recording disk, capable of preventing from lowering a recording disk draw force and having superior reliability and endurance.

A motor of an example of the present invention is a drive motor for a recording disk, in which a disk-shaped recording disk having a central hole rotates about a rotational center axis of a rotor, the drive motor includes: a centering portion located around the rotational center axis on the rotor, and having a radially outer peripheral surface; a recording disk mount surface formed on the rotor at a radialy outer peripheral area of the centering portion; and a plurality of chucks, each chuck has a elastic portion and a tip portion having a base portion accommodated in the centering portion.

Then, each of the tip portions of the plurality of chucks receives an elastic force from the elastic portion to press a circumferential edge of the central hole of the recording disk at least radially outwardly, whereby the recording disk is held on the recording disk mount surface.

A gap between a lower surface of the base portion of the tip portion and an upper surface of the rotor facing the base portion has narrower than a predetermined dimension to make a smooth movement of the tip portion when the recording disk is inserting into the centering portion on the rotor or removing from the centering portion on the rotor.

In the drive motor for a recording disk of the example of the present invention, the movement operating range of the chuck is restricted by the positioning portion. Therefore, a radial elastic force to the elastic portion is constantly applied to the recording disk via the chuck. Consequently, a lowering of the recording disk draw force can be prevented.

DETAILED DESCRIPTION OF THE INVENTION

Figure 1:
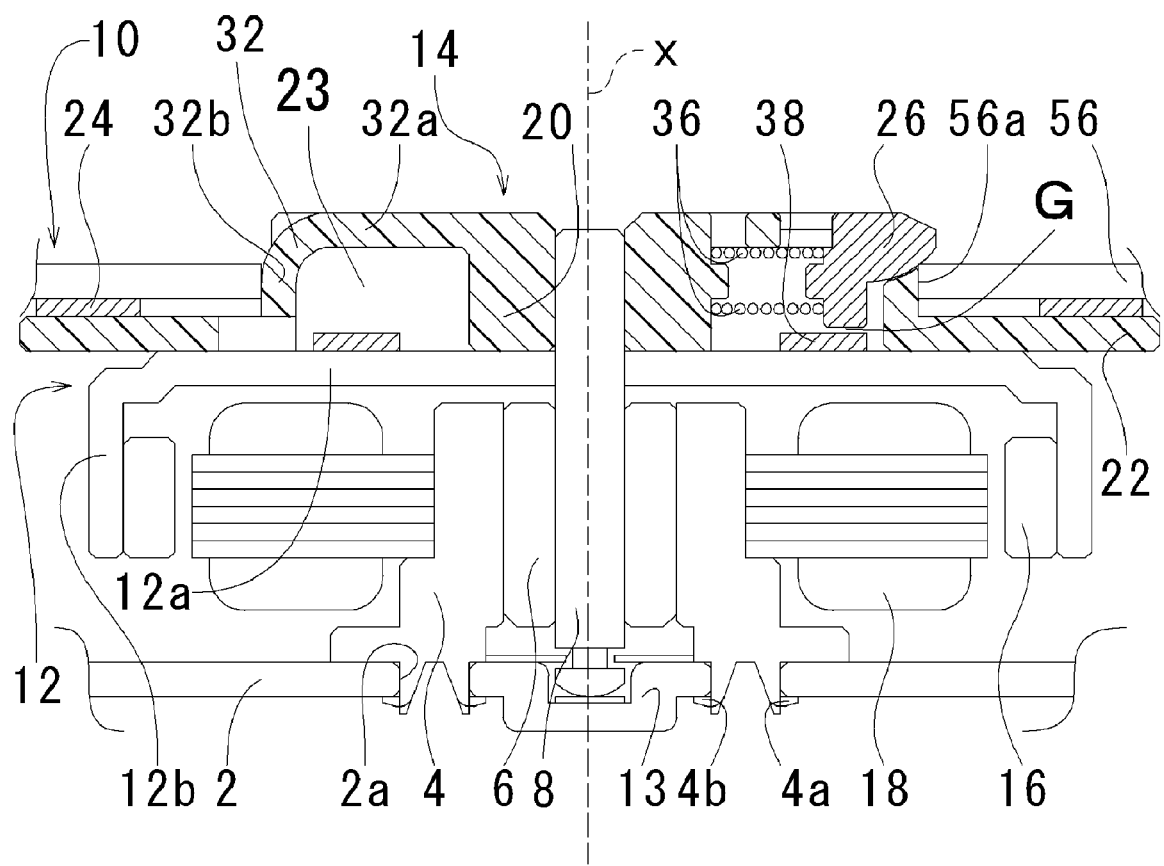
FIG. 1 is a sectional view of a drive motor for a recording disk according to a first embodiment of the present invention.

Each embodiment of the present invention will be explained below with reference to drawings. Further, in the description hereinafter, when position relationship and direction of respective members are described by the left, right, top and bottom, they do not show the positional relationship and direction incorporated in actual equipment, but they consistently show the positional relationship and direction merely shown in the drawings.

First Embodiment

Whole Motor Structure

Figure 2:
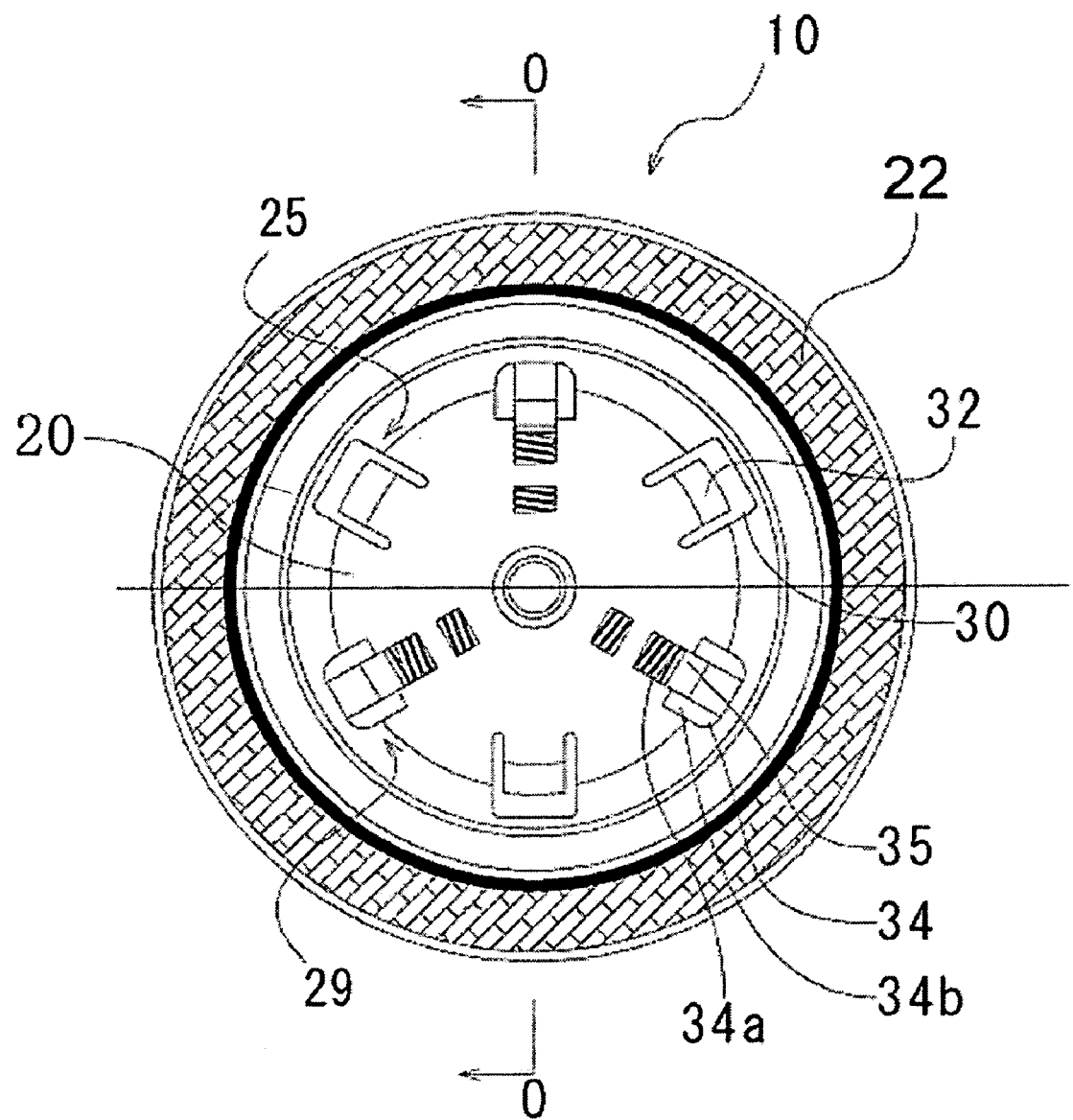
FIG. 2 is a view, seen from above, of the drive motor for a recording disk shown in FIG. 1.

FIG. 1 of a motor is a sectional view taken along the line o-o shown in FIG. 2.

The motor includes a frame 2, a substantially cylindrical bush 4 held by the frame 2, a sleeve 6 held in an inner circumferential portion of the bush 4, and a substantially cup-shaped rotor 10 having a shaft 8 rotatably supported by the sleeve 6.

A round hole 2a is formed in the frame 2 which is a static member and a base portion of the bush 4 is attached to the round hole 2a. The bush 4 is a substantially cylindrical member made of iron, stainless steel, or the like. The bush 4 is held to the frame 2 by performing radially outwardly plastic deformation of caulking portion 4a at its lower end. The sleeve 6 is mounted in the inner circumferential portion of the bush 4 and a closing plate 13, which seals an lower end portion of the bush 4, is mounted at a bottom portion of the bush 4. The closing plate 13 is held to the bush 4 by performing radially inwardly plastic deformation of a caulking portion 4b of the bush.

A rotor 10, which is a rotational member, substantially coaxially rotates with a rotational center axis X and includes: the shaft 8; a substantially cup-shaped rotor holder 12 made of magnetic material such as iron, which is formed by press work or the like, fixed to the shaft 8; and a disk holder 14 fixed to an upper portion of the shaft 8 with adhesive or the like. The rotor holder 12 includes a round cover portion 12a and a peripheral wall portion 12b perpendicularly formed from an outer peripheral portion of the round cover portion 12a. A rotor magnet 16 is held to an inner circumferential surface of the peripheral wall portion 12b and faced to a stator 18 held to the bush 4 via a radial gap.

Disk Holder Structure

The disk holder 14 includes a centering portion 20 fixed to an upper portion of the shaft 8 and a turn table 22 integrally formed with the centering portion 20. A cushioning material 24 is mounted on an outer peripheral upper surface portion of the turn table 22 and a recording disk 56 is mounted via the cushioning material 24.

The centering portion 20 and the turn table 22 are integrally molded with a resin material and, more particularly, the centering portion 20 and the turn table 22 are formed by, for example, polycarbonate (PC), polyphenylene sulfide (PPS), polyacetals (POM), or their composite material. As described, reduction of the number of components and cost down can be realized by integrally forming the centering portion 20 and the turn table 22 with a resin material.

An outer diameter of the centering portion 20 is designed to be a little bit smaller than the minimum size within a tolerance range of a central hole 56a of the recording disk 56. By this, when the central hole 56a of the recording disk 56 has a size which is within a tolerance range specified by the standards, the centering portion 20 is attached to the central hole 56a of the recording disk 56.

As shown in FIG. 2, the centering portion 20 includes an air pocket 23 formed inside thereof, a recording disk alignment mechanism 25 for aligning a center of the recording disk 56 mounted on the turn table 22 and a rotational center of the rotor 10, and a recording disk retention mechanism 29 mainly configured by a chuck 26 for controlling an axial movement of the recording disk 56 mounted on the turn table 22.

Recording Disk Alignment Mechanism 24

As shown in FIG. 2, three pairs of alignment holes 30 are formed in the centering portion 20 and the turn table 22 in a circumferentially evenly spaced disposition. An alignment pawl 32 is formed in between each pair of the alignment holes 30, and the alignment pawl has an upper end portion which is integrally formed with an outer peripheral portion of the centering portion 20 and extends radially outwardly as facing toward a lower end portion.

Each alignment pawl 32 includes a round portion 32a integrally formed with an upper end portion of the centering portion 20 and extending radially outwardly and a bent portion 32b extending radially outwardly as facing axially downwardly from a radially outer end portion of the round portion 32a. Further, the bent portion 32b is formed in circular arc when seen from a sectional view of FIG. 1. A lower end portion of the bent portion 32b of the each alignment pawl 32 a little bit protrudes radially outwardly from a periphery surface of the centering portion 20.

Now, the relationship of size between the recording disk 56 and the recording disk alignment mechanism 25 will be described. The maximum radius of a radially outer peripheral portion of the centering portion 20 is designed to be not more than the minimum radius within the tolerance range at the central hole 56a of the recording disk 56. On the other hand, a virtual circle radius formed by the lower end portion of the alignment pawl 32 is designed to be a little bit larger than the maximum radius within the tolerance range at the central hole 56a of the recording disk 56.

As for such an alignment pawl 32, it is desirable to be provided with at least three circumferential portions for aligning the recording disk 56.

Recording Disk Retention Mechanism 29

Three retaining holes 34 are formed in the centering portion 20 and the turn table 22 in a circumferentially evenly spaced disposition. Each retaining hole 34 is formed across a top wall portion and a side wall portion of the centering portion 20. Each retaining hole 34 includes an upper retaining hole 34a and a side retaining hole 34b continued to the upper retaining hole 34a and extending axially downwardly from the upper retaining hole 34a. A circumferential length of the side retaining hole 34b is longer than a circumferential length of the upper retaining hole 34a.

The pawl-shaped chuck 26 elastically biased by a coil spring 36 which is an elastic member radially movable forward and rearward, is disposed on the centering portion 20 and each retaining hole 34.

Figure 3:
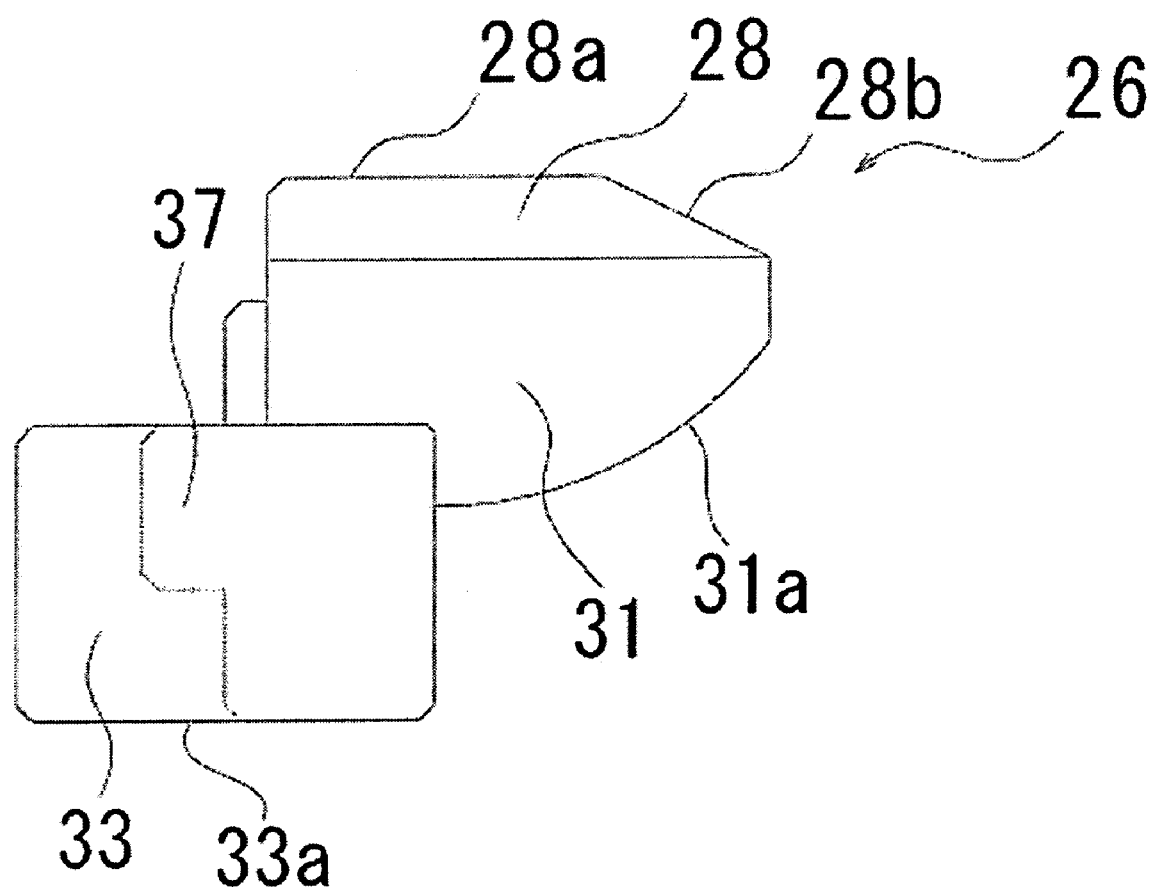
FIG. 3 is a side view of a chuck 26 shown in FIG. 1.
Figure 4:
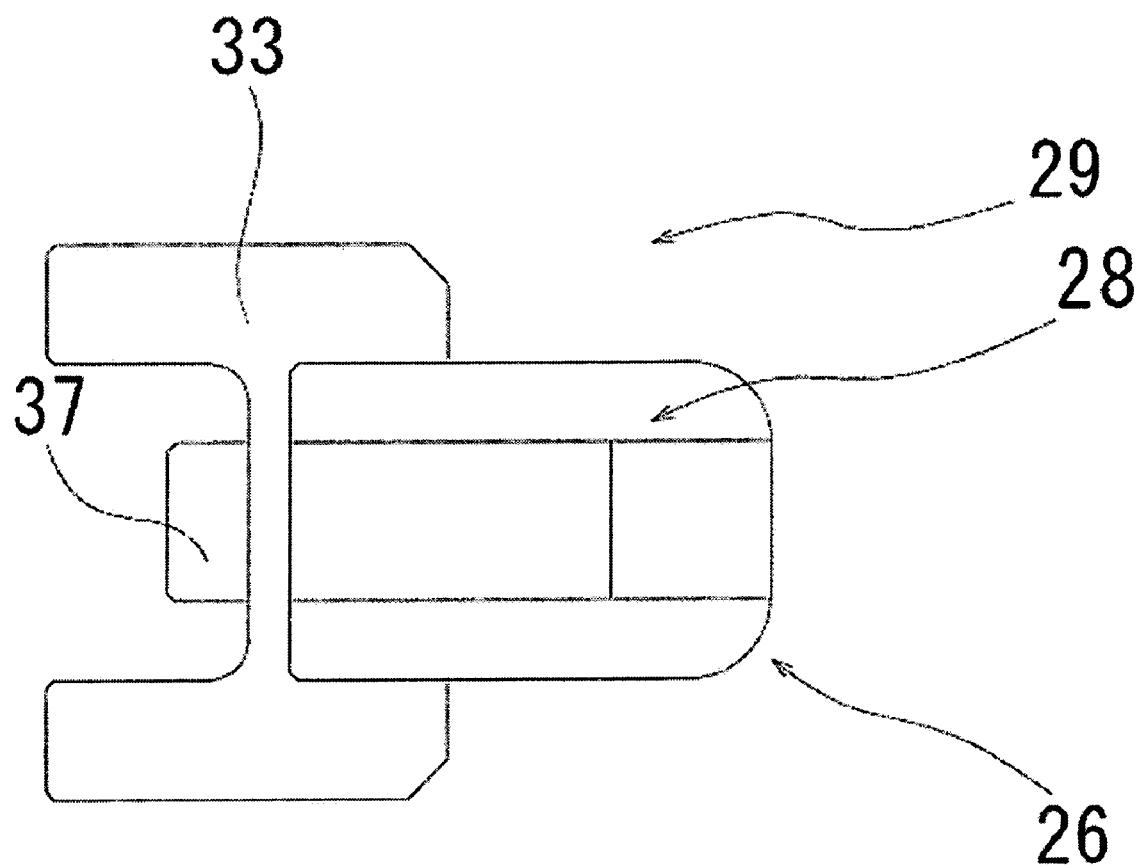
FIG. 4 is a view, seen from above, of the chuck 26 shown in FIG. 4.
Figure 5:
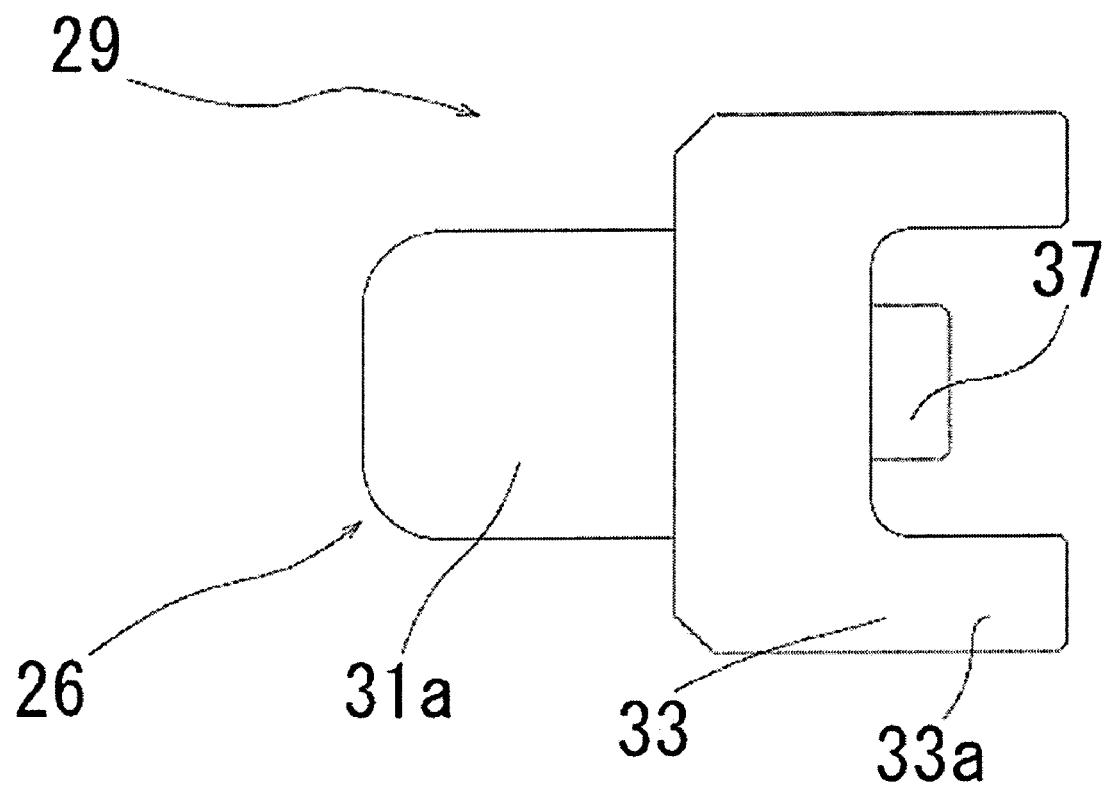
FIG. 5 is a view, seen from bottom, of the chuck 26 shown in FIG. 4.

A structure of the chuck 26 will be described using FIG. 3 to FIG. 5. The chuck 26 includes: a top wall portion 28 having a flat surface 28*a* and an upper inclined surface 28*b* inclining axially downwardly as facing radially outwardly (right side of FIG. 3) from the flat surface 28*a*; and a bottom wall portion 31 having a lower inclined surface 31*a* integrally formed with the top wall portion 28 and extending radially inwardly as facing axially downwardly from a radially outward tip portion of the upper inclined surface 28*b*. Further, the chuck 26 is integrally formed with the top wall portion 28 and the bottom wall portion 31 and includes a rectangular base portion 33 extending radially inwardly from the top wall portion 28 and the bottom wall portion 31 and a projecting portion 37. A circumferential width (vertical direction of FIG. 4) of the top wall portion 28 substantially conforms to a circumferential width of the upper retaining hole 34*a* of the centering portion 20. As described, the upper inclined surface 28*b* and the lower inclined surface 31*a* are formed on the chuck 26, thereby enabling the recording disk 56 to be attached or detached smoothly.

As shown in FIG. 1, the chuck 26 has its portion accommodated in the centering portion 20 and is disposed so as to be radially outwardly biased by the coil spring 36. The coil spring 36 has a radially inner end portion engaged with the centering portion 20 and a radially outer end portion engaged with the projecting portion 37 of the chuck 26. By this, the chuck 26 moves radially by an elastic force of the coil spring 36. Further, the coil spring 36 is accommodated in the centering portion 20 in a radially compressed state. Therefore, the chuck 26 moves radially outwardly by the elastic force; however, a portion of the lower inclined surface 30*a* of the chuck 26 is in contact with the side wall portion of the centering portion 20, thereby preventing the chuck 26 from protruding outside the centering portion 20.

Configuration of Spacer 38

Figure 6:
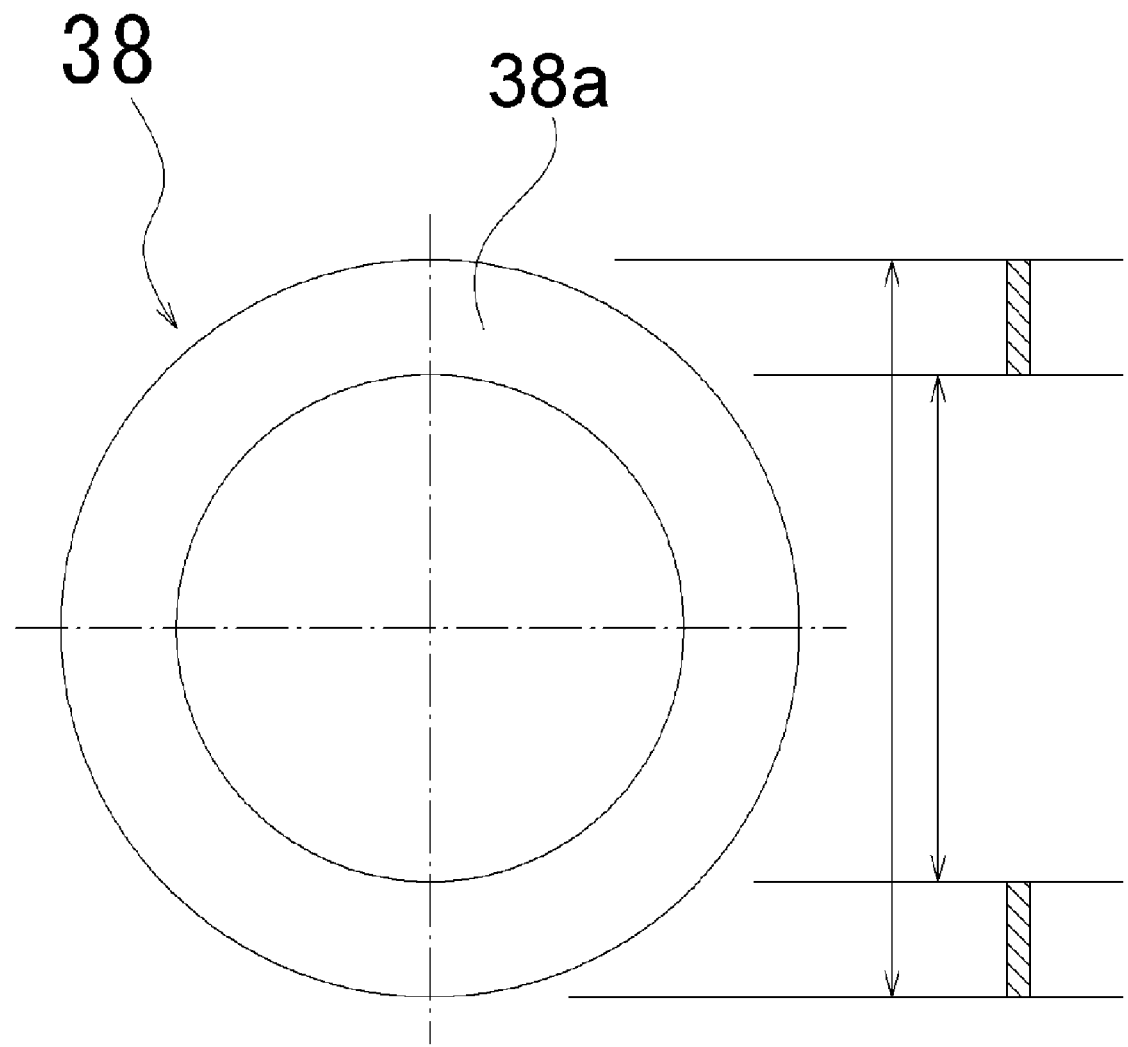
FIG. 6 is a view showing a spacer 38 shown in FIG. 1.

As shown in FIG. 6, a spacer 38, serving as a positioning portion, is mounted on the turn table 22 and the spacer 38 is faced to the base portion 33 of the chuck 26 via a small axial gap G. The spacer 38 is a ring shaped member made of a resin material having superior slide resistance and abrasion resistance. Further, the spacer 38 is not limited to the resin material, but various kinds of materials may be used; the shape is not limited to the ring shaped member, but a shape such as a circular arc member or the like may be used. In addition, the spacer 38 may be fixed to the turn table 22 by means of adhesive or the like.

Operation

Figure 7:
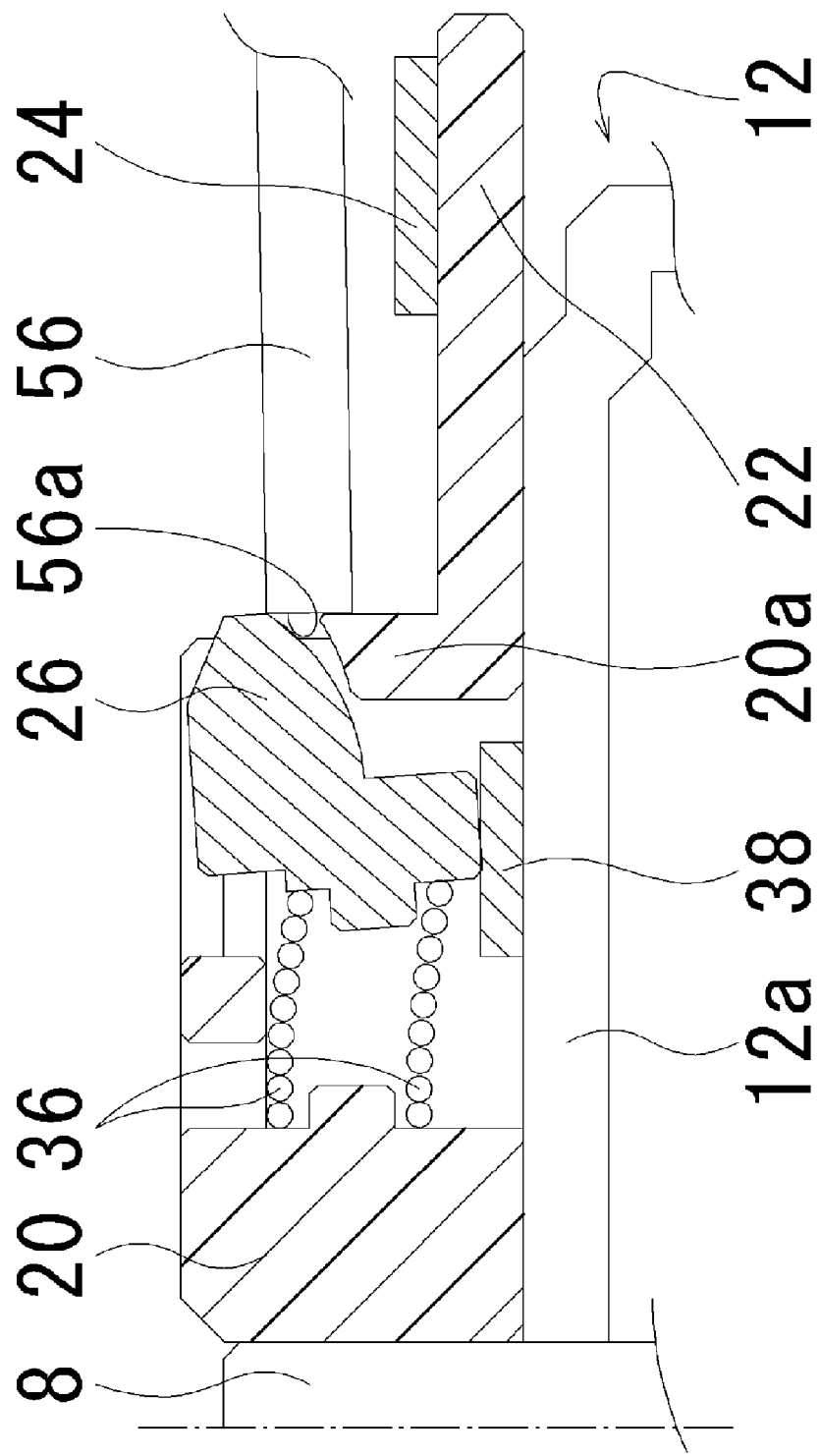
FIG. 7 is a view showing a state of removing a recording disk 56 from the drive motor for a recording disk shown in FIG. 1.

A state for attaching the recording disk 56 to the rotor 10 will be described using FIG. 1 or FIG. 7. The recording disk 56 is mounted on the centering portion 20 so that the central hole 56*a* is substantially coaxially disposed with the shaft 8. In such a state, when the recording disk 56 is pressed axially downwardly, its press force is applied to the upper inclined surface 28*b* of the chuck 26 and the chuck 26 moves radially inwardly by its radial component force. A lower edge of the inner circumferential surface of the recording disk 56 is coaxially introduced with the shaft 8 by sliding on outer surfaces of the upper inclined surface 28*b* and the bent portion 32*b* of the alignment pawl 32. The spring constant of the coil spring 36 is designed to be such a degree that the chuck 26 moves radially inwardly when the recording disk 56 is pressed by a light force, even such a force by a finger tip.

Then, when the lower edge of the inner circumferential surface of the recording disk 56 passes the upper inclined surface 28*b*, the chuck 26 is pushed by a restoring force of the coil spring 36 to move radially outwardly while the lower inclined surface 30*a* of the chuck 26 slides on the inner circumferential surface of the recording disk 56.

Consequently, after the recording disk 56 is attached to the rotor 10, the lower inclined surface 30*a* of the chuck 26 elastically presses the recording disk 56 from the axially upper side by the restoring force of the coil spring 36.

Further, the recording disk 56 is held and, at the same time, the recording disk 56 is also aligned as to be described below. As the recording disk 56 slides on the chuck 26, the bent portion 32*b* of the alignment pawl 32 also slides on the inner circumferential surface of the recording disk 56. The radii of the bent portions 32*b* of three alignment pawls 32 are formed so as to be equal respectively at any axial position. Consequently, the respective three alignment pawls 32 press the inner circumferential surface of the recording disk 56 evenly radially outwardly to perform alignment between the recording disk 56 and the rotor 10.

Next, a state for removing the recording disk 56 from the rotor 10 will be described. As shown in FIG. 7, when the recording disk 56 is moved axially upwardly from the state that the recording disk 56 is attached to the rotor 10, an upper edge of the inner circumferential surface of the recording disk 56 moves axially upwardly while sliding on the lower inclined surface 30*a* of the chuck 26 and the bent portion 32*b* of the alignment pawl 32.

At this time, the chuck 26 is exerted by a radially inward force by the press force of the recording disk 56 and a rotational force for raising the tip portion of the chuck 26 axially upwardly, that is, a force for moving the base portion axially downwardly. However, since the chuck 26 is faced to the spacer 38 via the small axial gap G at the axially lower side, when the chuck 26 moves axially downwardly, the chuck 26 is in contact with the spacer 38, so that axially downward movement is restricted. After that, in the state that the chuck 26 is in contact with the spacer 38, the lower surface 33*a* of the base portion 33 moves radially inwardly in some degree while sliding on the upper surface 38*a* of the spacer 38.

Then, recording disk 56 moves axially while the inner circumferential surface of the recording disk 56 makes the chuck 26 move radially inwardly, after that the recording disk 56 is removed from the rotor 10. When the lower edge of the inner circumferential surface of the recording disk 56 passes through an outermost peripheral portion of the chuck 26, the chuck 26 moves radially outwardly by the restoring force.

For example, even if the recording disk 56 tries to move axially due to outside shocks or the like, a movement operating range of the chuck 26 is restricted by the spacer 38, and therefore, the radial elastic force of the coil spring 36 is constantly applied to the inner circumferential surface of the recording disk 56 via the chuck 26. Consequently, a lowering of the recording disk draw force can be prevented compared to the conventional configuration and a motor with superior reliability and endurance can be provided.

Further, the movement operating range of the chuck 26 can be varied by changing an axial thickness of the spacer 38, and therefore, a recording disk draw force can be adjusted by a simple method. In addition, when the recording disk 56 is attached to the rotor 10, the spacer 38 is not related to the movement of the chuck 26, resulting in no effects on the recording disk attachment force.

Second Embodiment

Figure 8:
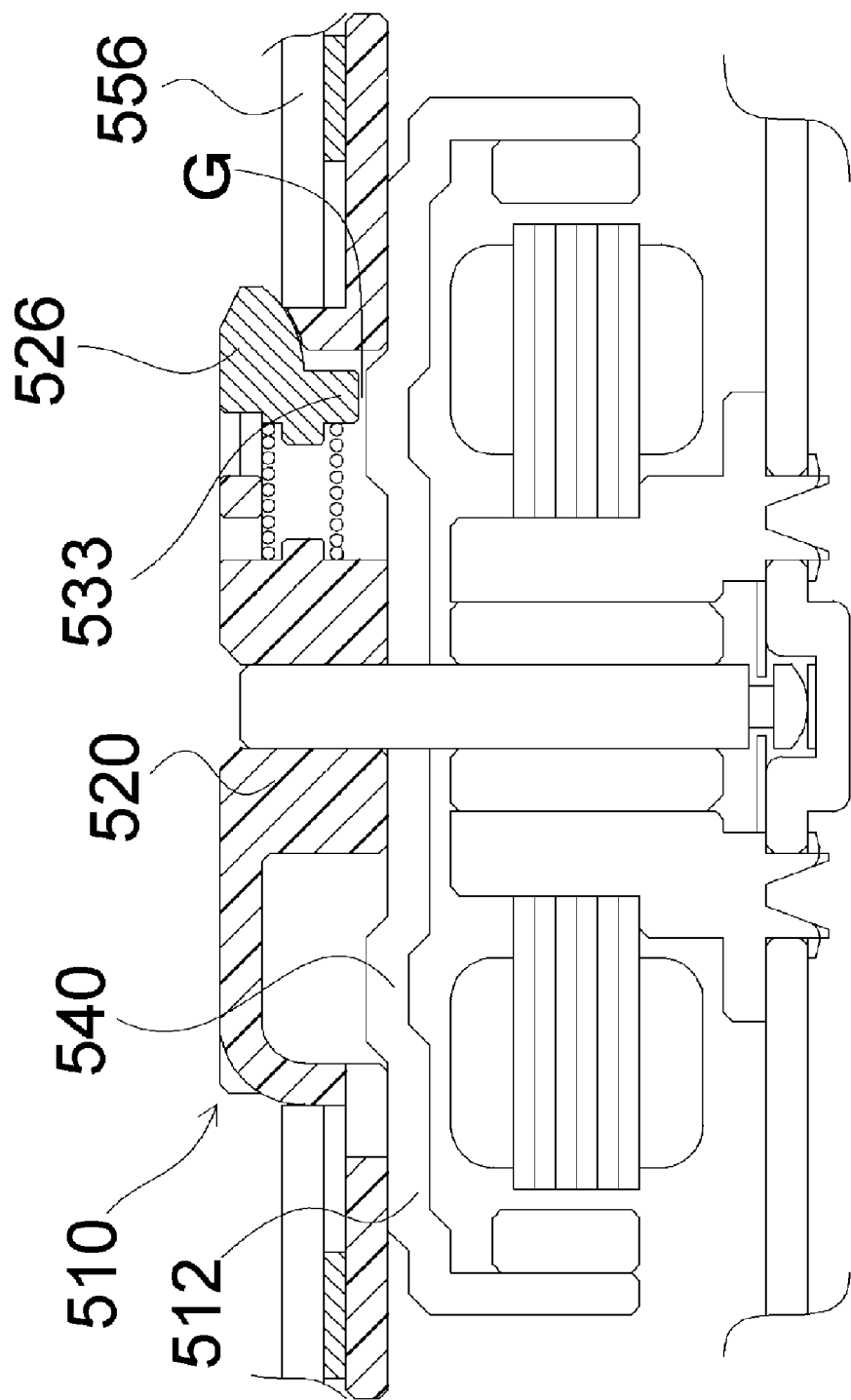
FIG. 8 is a sectional view of a drive motor for a recording disk according to a second embodiment of the present invention.

A second embodiment of the present invention will be described with reference to FIG. 8. Further, since a motor according to this embodiment is equivalent to the aforementioned first embodiment in basic structure, correspondence will be defined by reference numerals of corresponding members, which are shown in the number of 500, and only different points will be further described.

A projecting portion 540 circularly projected axially upwardly is formed at a portion facing to a base portion 533 of a chuck 526 on a rotor holder 512. The rotor holder 512 is a substantially cup-shaped circular member made of a magnetic material, which is formed by press work or the like, and the projecting portion 540 is formed together during the forming of the rotor holder 512.

As described above, the same effects as in the first embodiment can be obtained by forming the projecting portion 540. Further, since the projecting portion 540 is formed together during the forming of the rotor holder 512, the projecting portion 540 can be can be made inexpensively by a simple method and a lowering of the recording disk draw force of the chuck 526 can be positively prevented.

Further, the projecting portion 540 is formed in a ring shape, but the shape is not limited to this, the projecting portion may be formed in a circular arc shape or the like.

Third Embodiment

Figure 9:
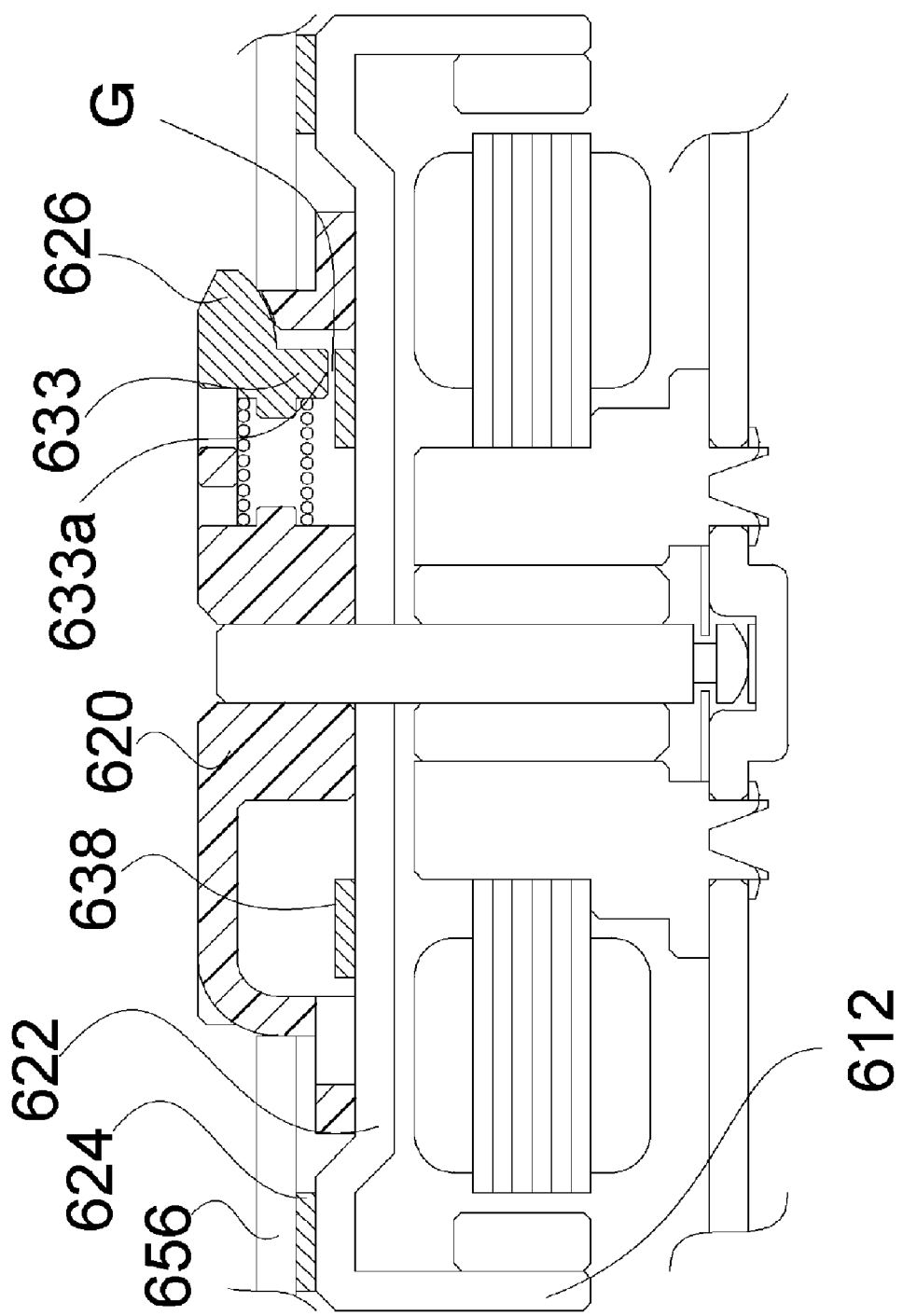
FIG. 9 is a sectional view of a drive motor for a recording disk according to a third embodiment of the present invention.

A third embodiment of the present invention will be described with reference to FIG. 9. Further, since a motor according to this embodiment is equivalent to the aforementioned first embodiment in basic structure, correspondence will be defined by reference numerals of corresponding members, which are shown in the number of 600, and only different points will be further described.

In the third embodiment, a rotor holder 612 and a turn table 622 are integrally formed. The rotor holder 612 is a substantially cup-shaped circular member made of a magnetic material, which is formed by press work or the like. Then, a cushioning material 624 is mounted on an outer peripheral portion of a turn table 622 and a recording disk 656 is mounted via the cushioning material 624.

Further, a spacer 638 is mounted on a turn table 622 and the spacer 638 is faced to a lower surface 633a of a base portion 633 of a chuck 626 via a small axial gap G. The same effects as in the first embodiment can be obtained by providing the spacer 638 on the turn table 622.

In addition, a projecting portion extending axially upwardly may be formed at a portion facing to the base portion 633 of the chuck 626 on the turn table 622. The projecting portion is formed together during the forming of the turn table 622 and the rotor holder 612. The same effects as in the second embodiment can be obtained by forming the projecting portion.

Recording Disk Drive

Figure 10:
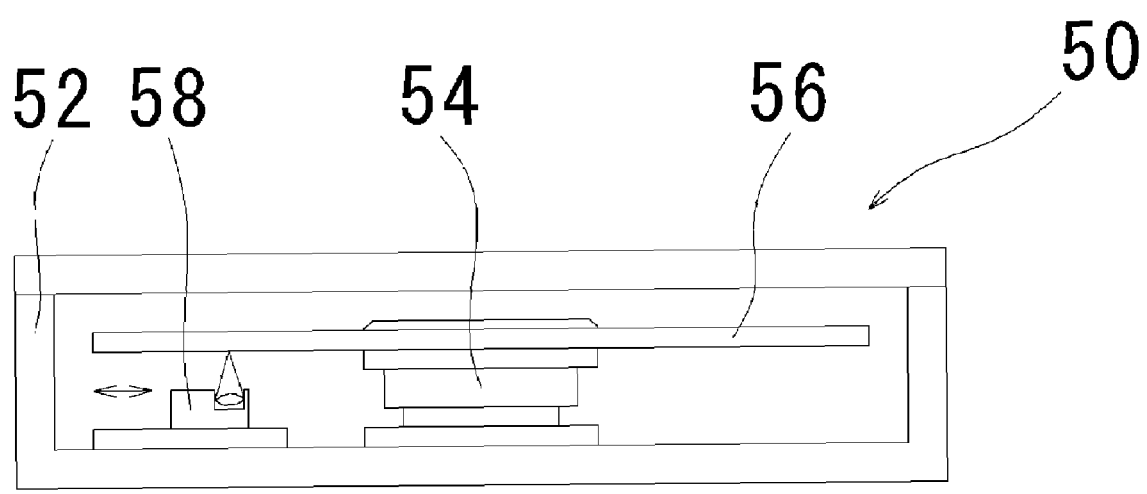
FIG. 10 is a sectional view showing a recording disk drive of an example according to the present invention.
Figure 11:
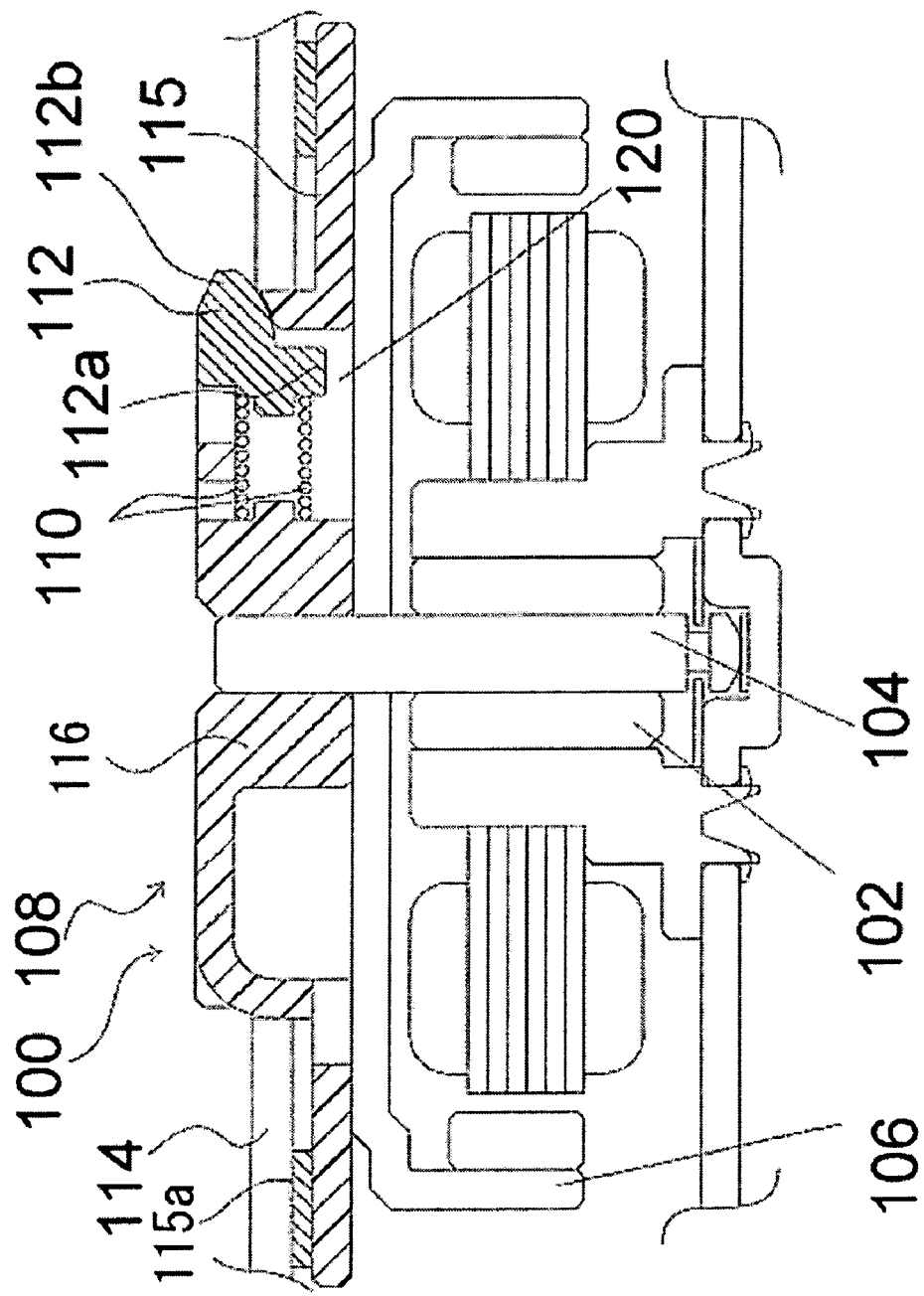
FIG. 11 is a sectional view showing a conventional drive motor for a recording disk.

Now, an internal configuration of a recording disk drive 50 will be described with reference to FIG. 10. The recording disk drive 50 includes a housing 52; a motor 54, which is described in each of the aforementioned embodiments, fixed in the housing 52; a disk-shaped recording disk 56 held by the motor 54; and a pickup device 58 for reading/writing information from/on a required position of the recording disk 56 during the rotation of the motor 54.

In such way, a recording disk drive with superior reliability and endurance can be provided by mounting the motor, equipped with the present invention, on the recording disk drive 50.

As described above, the drive motor for a recording disk according to the present invention and one embodiment of the recording disk drive equipped with the drive motor for a recording disk are described, but the present invention is not limited to such embodiments and it is possible that various changes and modifications may be made without extending beyond the scope of the present invention.

For example, a positioning portion may be formed between a turn table and a base portion of a chuck by fixing a centering portion on a turn table.

What is claimed is:

1. A drive motor for a recording disk, in which a disk-shaped recording disk having a central hole is mounted on a rotor, for rotating about a rotational center axis of the rotor, the drive motor for a recording disk comprising:
   a rotor holder;
   a centering portion located around the rotational center axis on the rotor holder, wherein a radially outer peripheral surface of the centering portion makes a center of the recording disk be aligned with the rotational center axis of the rotor holder by contacting with an inner circumference of the central hole of the recording disk;
   a recording disk mount surface formed on the rotor holder at a radially outer peripheral area of the centering portion;
   a positioning portion disposed on the rotor holder; and
   a plurality of chucks located radially in the centering portion, wherein each chuck comprising:
      a wall portion extending radially outward;
      a projecting portion extending radially inward from the wall portion;
      a base portion extending radially inward, and axially downward, from the wall portion, the base portion having a lower surface; and
      an elastic portion located between the centering portion and the projecting portion, the elastic portion elastically biasing the chuck, wherein an inner end of the elastic portion is fixed to the centering portion and an outer end of the elastic portion is fixedly connected with the projecting portion to support the chuck in radially moveable manner, wherein a gap is formed between the lower surface of the base portion and the positioning portion such that the positioning portion contacts the lower surface when the disk-shaped recording disk is removed from the centering portion.

2. The drive motor for a recording disk according to claim 1,
   wherein the wall portion includes an upper inclined surface being getting closer to the disk mount surface in accordance with increasing a distance from the rotational center axis and a lower inclined surface being getting apart from the disk mount surface in accordance with increasing a distance from the rotational center axis.

3. The drive motor for a recording disk according to claim 1,
   wherein a disk-shaped turn table, rotating substantially coaxially with the rotational center axis and having the recording disk mount surface, is disposed on the rotor holder.

4. The drive motor for a recording disk according to claim 3,
   wherein the positioning portion is integrally formed with the rotor holder.

5. The drive motor for a recording disk according to claim 3,
   wherein the rotor holder, rotating substantially coaxially with the rotational center axis and having a round cover portion, is disposed at an axially lower portion of the turn table.

6. The drive motor for a recording disk according to claim 5,
   wherein the positioning portion is integrally formed with the rotor holder.

7. The drive motor for a recording disk according to claim 1,
   wherein the rotor holder, rotating substantially coaxially with the rotational axis and having a round cover portion and the recording disk mount surface, is disposed at an axially lower side of the centering portion.

8. The drive motor for a recording disk according to claim 7,
   wherein the centering portion is fixed on the rotor holder, and the positioning portion is disposed on an upper surface of the round cover portion of the rotor holder, and the gap is formed between the lower surface of the base portion and an upper surface of the positioning portion.

9. The drive motor for a recording disk according to claim 7,
   wherein the positioning portion is integrally formed with the rotor holder.

10. The drive motor for a recording disk according to claim 1, further comprising:
    a rotor magnet held by the rotor holder; and
    a stator, which is a static member, facing to the rotor magnet.

11. A recording disk drive, in which a disk-shaped recording disk having a central hole rotates substantially concentrically with a rotational center axis, the recording disk drive comprising:
    a housing;
    a drive motor for a recording disk as in claim 1, fixed inside the housing, for rotating the recording disk; and
    an information access section for reading and/or writing information from/on a required position of the recording disk.

12. A drive motor for a recording disk, comprising:
    a rotor holder for rotating about a rotational center axis, the rotor holder having an upper surface;
    a centering portion disposed on the rotor holder about the rotational center axis;
    a turn table disposed on the rotor holder, the turn table being located radially outward from the centering portion, the turn table being capable of disposing a recording disk thereon;
    a plurality of chucks located radially between the centering portion and the turn table, each of the chucks comprising:
        a wall portion extending radially outward;
        a base portion extending radially inward, and axially downward, from the wall portion, the base portion having an lower surface; and
        an elastic portion disposed between the centering portion and the chuck, the elastic portion elastically biasing the chuck,
    a positioning portion disposed on the upper surface to face the lower surface with a gap such that the positioning portion contacts the lower surface when the disk-shaped recording disk is removed from the centering portion.

13. The drive motor for a recording disk according to claim 12,
    wherein the wall portion comprises a top wall portion and a bottom wall portion, wherein the top wall portion has an upper inclined surface inclining axially downward as facing radially outward, and wherein the bottom wall portion has a lower inclined surface extending radially inward as facing axially downward.

14. The drive motor for a recording disk according to claim 12, wherein the positioning portion is integrally formed with the rotor holder.

15. The drive motor for a recording disk according to claim 12, wherein the positioning portion is a spacer disposed on the upper surface.

16. The drive motor for a recording disk according to claim 14, wherein the positioning portion is formed on the rotor holder by press work.

17. The drive motor for a recording disk according to claim 12, wherein the disk-shaped recording disk is inserted into or removed from the centering portion, and the positioning portion restricts the downward movement of the chuck.

18. The drive motor for a recording disk according to claim 1, wherein the lower surface of the base portion is located lower than the elastic portion.

19. The drive motor for a recording disk according to claim 12, wherein the lower surface of the base portion is located lower than the elastic portion.

20. The drive motor for a recording disk according to claim 12, each of the chuck further comprising a projecting portion extending radially inward from the wall portion, wherein the elastic portion is disposed between the centering portion and the projecting portion.

* * * * *